United States Patent [19]
Park

[11] Patent Number: 5,610,881
[45] Date of Patent: Mar. 11, 1997

[54] METHOD FOR PREVENTING AUDIO DATA ON A SCRATCHED PORTION OF A COMPACT DISC FROM BEING REPRODUCED IN A COMPACT DISC PLAYER

[75] Inventor: Sang J. Park, Suwon, Rep. of Korea

[73] Assignee: Samsung Electronics Co., Ltd., Kyungki-do, Rep. of Korea

[21] Appl. No.: 649,442

[22] Filed: May 17, 1996

[30] Foreign Application Priority Data

Jul. 25, 1995 [KR] Rep. of Korea ............... 95-22149

[51] Int. Cl.⁶ .................................................. G11B 7/00
[52] U.S. Cl. ................................................. 369/32; 369/58
[58] Field of Search ............................. 369/32, 33, 47, 369/48, 50, 54, 58, 124, 44.28, 44.32; 360/78.01, 78.04

[56] References Cited

U.S. PATENT DOCUMENTS

| | | | |
|---|---|---|---|
| 4,811,124 | 3/1989 | Dujari et al. | 369/54 X |
| 5,247,507 | 9/1993 | Morimoto et al. | 369/111 |
| 5,274,615 | 12/1993 | Rokutan | 369/32 |

Primary Examiner—Georgia Y. Epps
Assistant Examiner—P. W. Huber
Attorney, Agent, or Firm—Sughrue, Mion, Zinn, Macpeak & Seas

[57] ABSTRACT

A method for preventing audio data recorded on a scratched portion of a compact disc from being reproduced in a compact disc player. A reference track position of the compact disc being reproduced is detected and during playback, it is determined whether a predetermined number of tracks have been advanced from the reference track position. If it is determined that the predetermined number of tracks have not been advanced from the reference position, a skip command is inserted in program data associated with the reference track position to correct the associated program data. Alternatively, if it is determined that the predetermined number of tracks have not been advanced from the reference track position, an error count is incremented by one and then compared with a predetermined reference value to check whether the incremented error count is greater than or equal to the predetermined reference value. If it is determined that the incremented error count is smaller than the predetermined reference value, the reproduction operation continues without modification. However, if it is determined that the incremented error count is greater than or equal to the predetermined reference value, the skip command is inserted in the program data associated with the reference track position to correct the associated program data.

6 Claims, 3 Drawing Sheets

METHOD FOR PREVENTING AUDIO DATA ON A SCRATCHED PORTION OF A COMPACT DISC FROM BEING REPRODUCED IN A COMPACT DISC PLAYER

BACKGROUND OF THE INVENTION

1. Field of the Invention

The present invention relates in general to preventing the reproduction of audio data on a scratched portion of a compact disc in a compact disc player (referred to hereinafter as "CDP"). More particularly, the present invention relates to a method for preventing audio data on a scratched portion of a compact disc from being reproduced in a CDP, in which tracks of the compact disc being reproduced are checked. When an abnormal track is detected, the associated program data from a lead-in area of the compact disc is detected and corrected, thereby preventing the audio data on the abnormal track from being repeatedly reproduced.

2. Description of the Prior Art

Generally, a compact disc comprises a circular plate having a diameter of 12 cm which is recorded with audio data. The data recorded produces music or other information over an interval of one hour or more. The data recorded at such a high density are reproduced by a pickup in a CDP in a non-contact fashion that the tracks are not abraded during playback. Such non-contact reproduction ensures that the life of the compact disc will be semipermanent. Because the compact disc is digitally recorded, the recorded data does not undergo significant signal degradation. Therefore, a compact disc produces a high signal-to-noise ratio (S/N ratio) of at least 90 dB, which is higher than conventional circular plate discs. The compact disc is also provided with a reflecting film made of aluminum on its recorded areas, thereby exhibiting a high durability against external impacts.

A compact disc has three areas, namely, a lead-in area, a general signal area and a lead-out area. The general signal area is recorded with the audio data. The lead-in area is recorded with program data associated with the audio data recorded on the general signal area. The lead-out area is recorded with program data indicating that all information recorded on the compact disc has been reproduced. When a user selects a recording for playback, the CDP detects the program data in the lead-in area associated with the audio data recorded on the general signal area of the compact disc. The CDP determines an initial track position of the compact disc on which the associated information is recorded, according to the detected program data. Then, the CDP directs the pickup to the determined track position of the compact disc, thereby reproducing the associated information starting from the track position. In this manner, the CDP can selectively reproduce the selected recording from a plurality of audio data recorded in the general signal area of the compact disc.

In the CDP, however, the pickup may not be able to reproduce the audio data recorded on the compact disc due to a scratch or other damage on the disc. In this situation, the pickup repeatedly reproduces the audio data on the same track or it returns to the previous track. Such a situation is generally referred to as "bouncing." In this case, the user's listening experience deteriorates because he must repeatedly listen to the same information in a short period.

Further, in order to prevent the CDP from repeatedly reproducing the audio data on the same track when the "bouncing" occurs, the user must direct the CDP to skip that portion of the track each time the audio data thereon is reproduced. This is inconvenient to the user.

SUMMARY OF THE INVENTION

The present invention has been made in view of the above problems, and it is an object of the present invention to provide a method for preventing audio data recorded on a scratched portion of a compact disc from being reproduced in a CDP. To achieve this object, a track of the compact disc being reproduced is checked, when an abnormal track is detected, program data associated with the track is detected from a lead-in area of the compact disc, and the detected program data is modified with a skip command for playback correction, thereby providing an automatic skip function to be performed when the audio data on the abnormal track is encountered. This prevents the audio data on the abnormal track from being repeatedly reproduced.

In accordance with the present invention, the above and other objects can be accomplished through a method for preventing audio data on a scratched portion of a compact disc from being reproduced in a compact disc player wherein the compact disc has audio and program data recorded thereon, the compact disc player has a random access memory for storing the program data recorded on the compact disc, a timer for outputting time information, and a microcomputer for controlling the operation of the compact disc player in response to the program data recorded on the compact disc. The method comprises a procedure for detecting a reference track position of the compact disc being reproduced and checking whether a predetermined number of tracks have been advanced from the reference track position; and a procedure for inserting a skip command in program data associated with a track position when an abnormal track is detected to correct the associated program data. An abnormal track is detected if during the detecting procedure it is determined that the predetermined number of tracks have not been advanced from the reference track position.

The detecting procedure further comprises the steps of detecting the reference track position of the recording being reproduced; initializing the timer and starting a counting operation thereof; comparing the time counted by the timer with a predetermined reference time to check whether the counted time is the same as the predetermined reference time; checking whether the predetermined number of tracks have been advanced from the reference track position if during the time comparing step it is determined that the counted time is the same as the predetermined reference time.

The inserting procedure comprises the steps of outputting a control signal to the random access memory to locate the program data associated with the reference track position if it is determined during the detecting procedure that the predetermined number of tracks have not been advanced from the reference track position. The inserting procedure further comprises the step of inserting the skip command in the program data detected at the output control step to correct the detected program data and storing the corrected program data in the random access memory.

The present method further comprises the steps of incrementing an error count by one if it is determined during the detecting procedures that the predetermined number of tracks have not been advanced from the reference track position, comparing the incremented error count with a predetermined reference value to check whether the incremented error count is greater than or equal to the predetermined reference value, continuously performing the reproduction operation if it is checked that the incremented error count is smaller than the predetermined reference value and proceeding to the skip insertion procedure if it is checked that the incremented error count is greater than or equal to the predetermined reference value.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
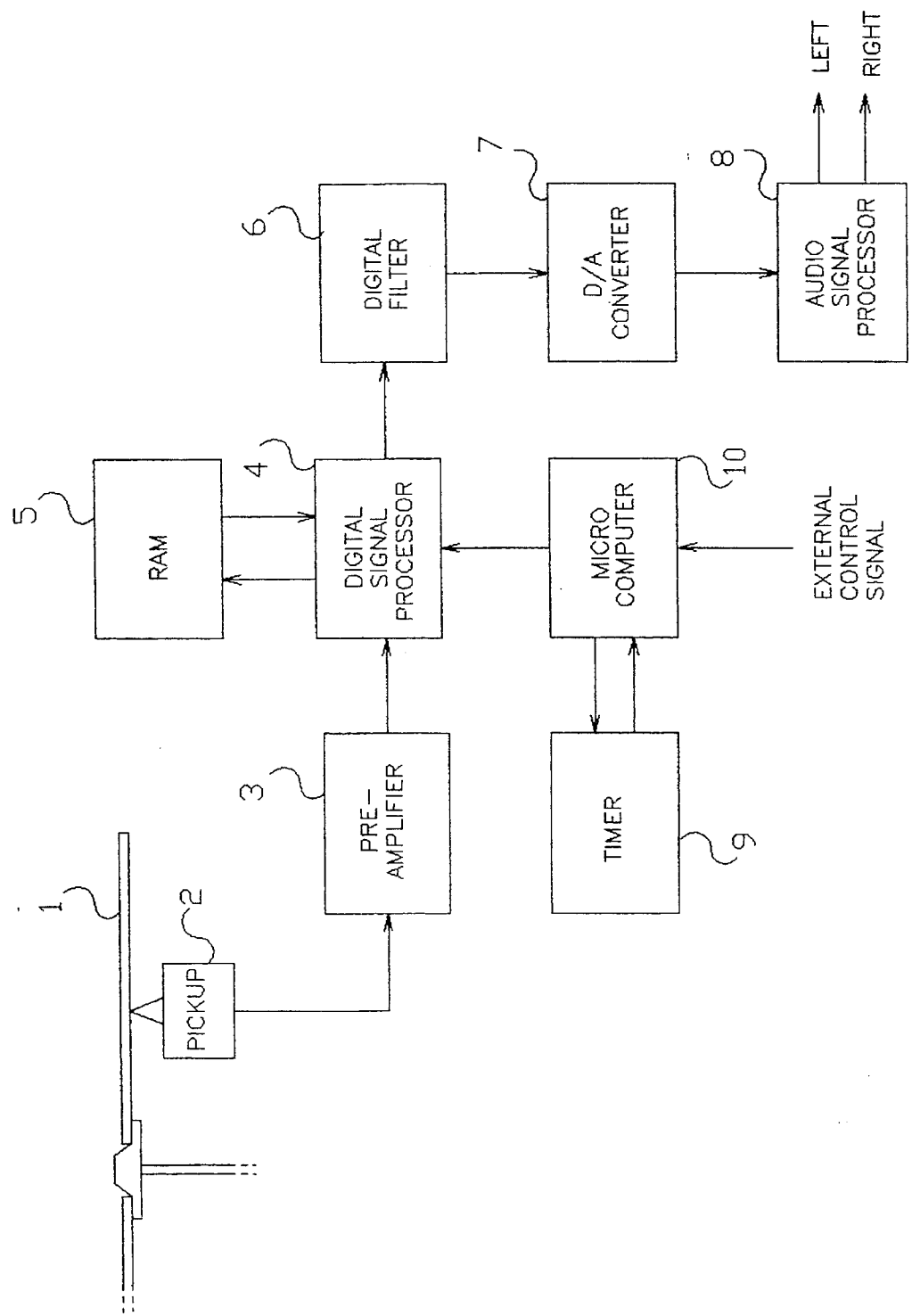
FIG. 1 is a schematic block diagram of a CDP which is applied to the present invention.

Referring to FIG. 1, there is shown a schematic block diagram of a CDP which is applied to the present invention. As shown in this drawing, the CDP comprises a pickup 2 for detecting digital audio data recorded on a lead-in area of the disc, a pre-amplifier 3 for amplifying the digital audio data and program data detected by the pickup 2 to a level suitable for signal processing, a digital signal processor 4 for separating the digital audio data and program data amplified by the pre-amplifier 3, a random access memory (RAM) 5 for storing the program data separated by the digital signal processor 4, a digital filter 6 for filtering a noise component of the digital audio data separated by the digital signal processor 4, a digital/analog converter (D/A converter) 7 for converting the pure digital audio data from the digital filter 6 into analog audio data, an audio signal processor 8 for processing the analog audio data from the D/A converter 7 and outputting the resultant audio signal, a timer for outputting time information, and a microcomputer 10 for controlling the entire operation of the CDP in response to an external control signal.

The operation of the CDP with the above-mentioned construction, as applied in the present invention, will hereinafter be described in detail with reference to FIG. 2.

Figure 2:
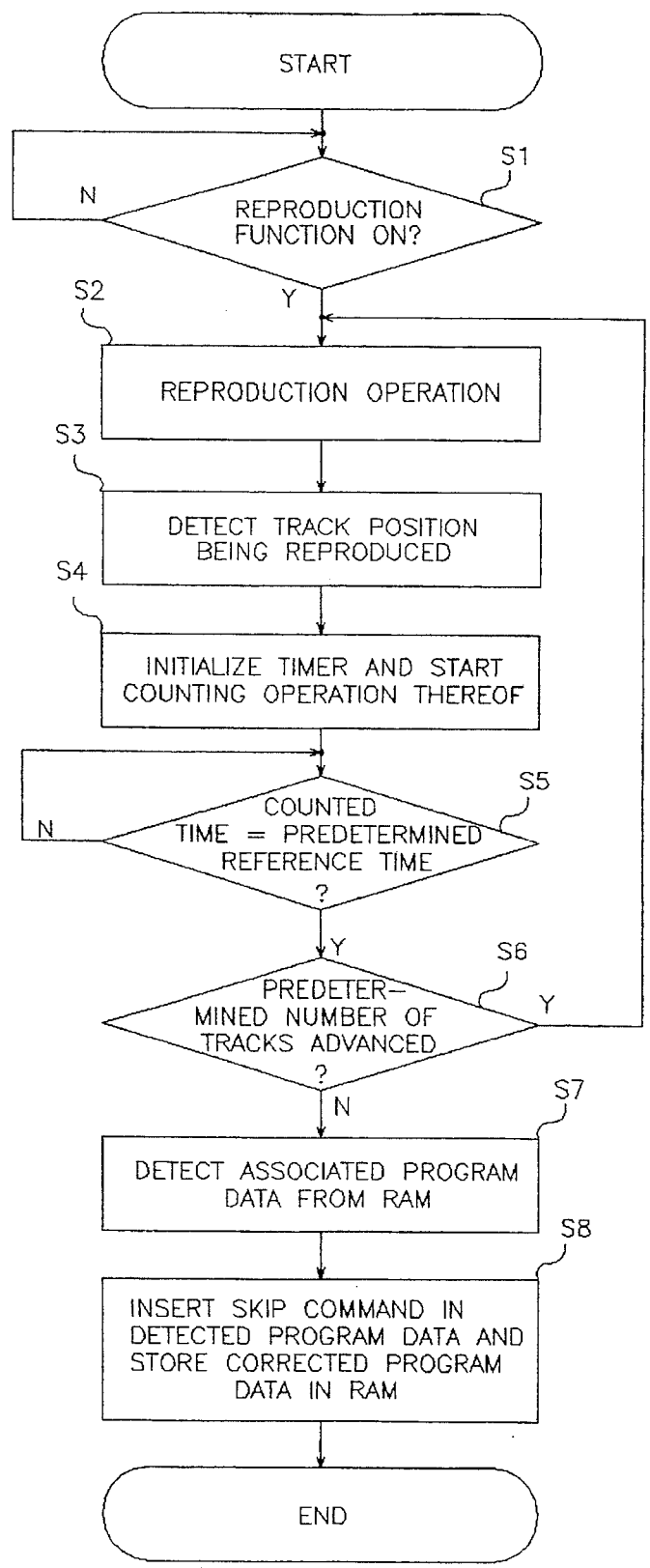
FIG. 2 is a flowchart illustrating the operating of a microcomputer in FIG. 1 which performs a method for preventing audio data on a scratched portion of a compact disc from being reproduced in a CDP, in accordance with an embodiment of the present invention.

FIG. 2 is a flowchart illustrating the operation of the microcomputer 10 in FIG. 1 for performing a method for preventing audio data on a scratched portion of the compact disc 1 from being reproduced in the CDP, in accordance with an embodiment of the present invent. If the main power of the CDP is turned on, the microcomputer 10 performs step S1 to check whether a reproduction function has been selected by the user to reproduce audio data recorded on the compact disc 1. If a reproduction function has not been selected by the user, the microcomputer 10 returns to step S1 to check continuously whether the reproduction function has been selected by the user.

If the reproduction function has been selected by the user, the microcomputer 10 controls the CDP to perform step S2, the reproduction operation. Specifically, if the reproduction function is selected by the user, the microcomputer 10 outputs an acceleration control signal to a spindle motor (not shown). The spindle motor has a shaft in contact with the compact disc 1. As the spindle motor is driven, the compact disc 1 is rotated.

As the compact disc 1 is rotated, the program data on the lead-in area and the digital audio data on the general signal area are detected by the pickup 2 and are then amplified by the pre-amplifier 3 to the level suitable for signal processing. The program data on the lead-in area, amplified by the pre-amplifier 3, are stored in the RAM 5 through the digital signal processor 4. As a result, program information regarding the audio data recorded on the general signal area of the compact disc 1 can be detected from the RAM 5 according to the user's selection.

On the other hand, the digital audio data on the general signal area, amplified by the pre-amplifier 3, are separated from the program data on the lead-in area by the digital signal processor 4 and are then supplied to the digital filter 6. The digital filter 6 filters a noise component of the digital audio data and supplied the resultant pure digital audio data to the D/A converter 7. The D/A converter 7 converts the pure digital audio data from the digital filter 6 into analog audio data. The audio signal processor 8 processes the analog audio data from the D/A converter 7 and outputs the resultant audio signal with left (L) and right (R) channel components.

In performing the reproduction operation of step S2, the microcomputer 10 detects the position of a track of the compact disc 1 from which the audio data is detected by the pickup 2, at step S3. Then, the microcomputer 10 outputs a control signal to the timer 9 at step S4 to initialize the timer 9 and start a counting operation.

Thereafter, the microcomputer 10 compares the time counted by the timer 9 with a predetermined reference time at step S5 to determine whether the counted time is the same as a predetermined reference time. If it is determined at step S5 that the time counted by the time 9 is not the same as the predetermined reference time, the microcomputer 10 returns to step S5 to perform continuously the checking operation until the counted time becomes the same as the predetermined reference time.

In the case where it is determined at step S5 that the time counted by the timer 9 is the same as the predetermined reference time, the microcomputer 10 determines at step S6 whether a predetermined number of tracks have been advanced from the reference track position detected at step S3. If it is determined at step S6 that the predetermined number of tracks have been advanced from the track position detected at step S3, the microcomputer 10 recognizes that the reproduction operation is being normally performed and then returns to step S2 to repeat the above-mentioned steps S2 to S6 based on a new reference track.

On the other hand, if it is determined at step S6 that the predetermined number of tracks have not been advanced from the reference track position detected at step S3, the microcomputer 10 recognizes that the reproduction operation is being abnormally performed because the pickup 2 has not normally proceeded from the reference track position due to a scratch or other damage on the disc. As a result, the microcomputer 10 outputs a control signal to the RAM 5 at step S7 to detect program data associated with the detected track position therefrom. At step S8, the microcomputer 10 corrects the program data stored in the RAM 5 by inserting a skip command in the program data. Then at step S8, the microcomputer 10 outputs a control signal to the RAM 5 to store the corrected program data therein and ends the entire operation. As a result, when the user again selects the reproduction function for the compact disc 1, the CDP automatically skips the scratched track of the compact disc 1 and reproduces only the audio data recorded on the normal tracks of the compact disc 1.

Alternatively, in FIG. 2, the microcomputer 10 may check whether the condition of abnormal track advancement from the reference track position is repeated for a predetermined number of times. When the condition of abnormal advancement is repeated for a predetermined number of times, the microcomputer 10 may correct the program data associated with the detected track position and store the corrected program data in the RAM 5. This procedure is performed to allow the microcomputer 10 to distinguish between abnormal pickup movement along the tracks of the compact disc 1 due to an external vibration and abnormal pickup movement due to disc defects.

Figure 3:
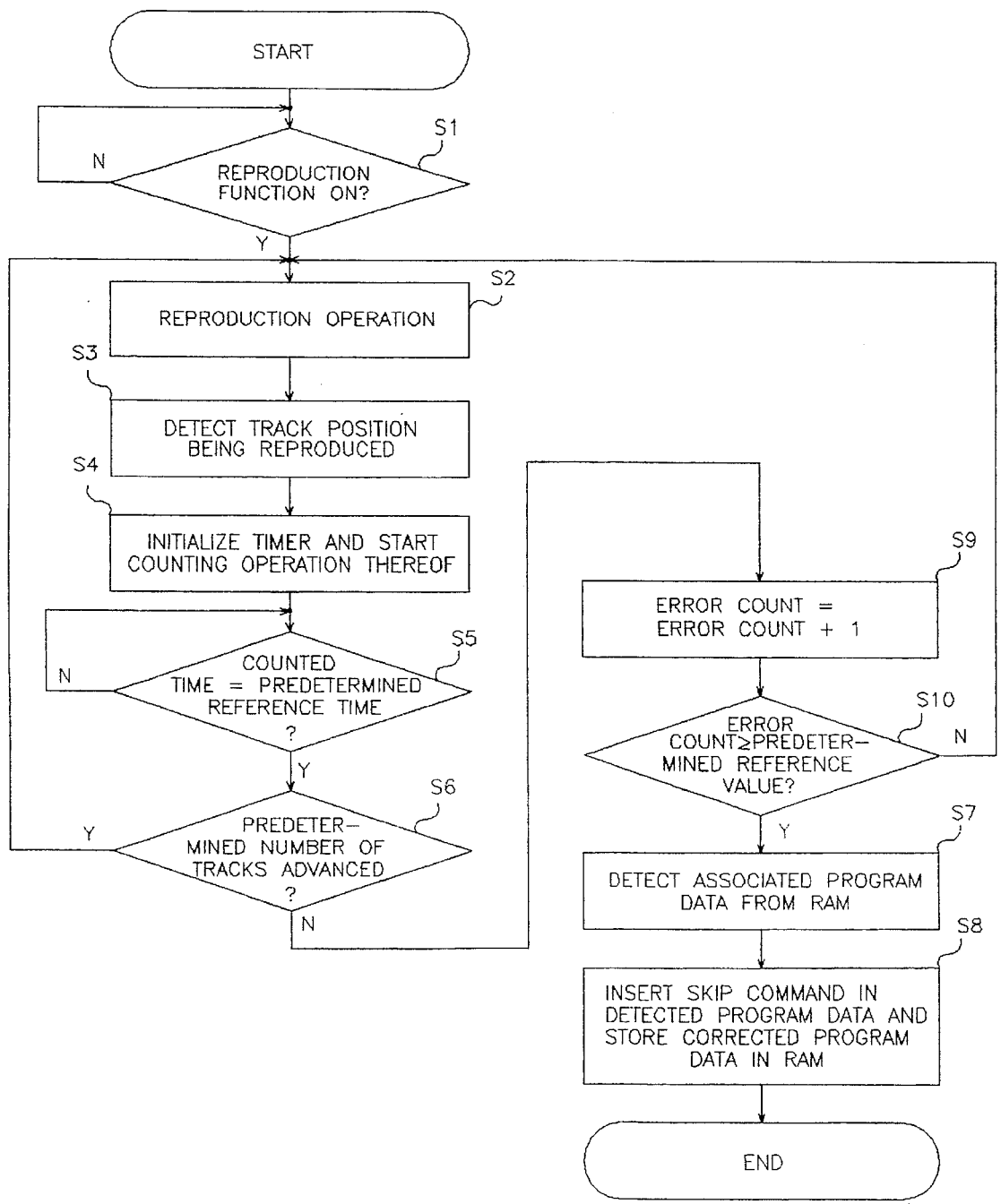
FIG. 3 is a flowchart illustrating the operation of the microcomputer in FIG. 1 which performs a method for preventing audio data on a scratched portion of a compact disc from being reproduced in a CDP, in accordance with an alternative embodiment of the present invention.

In other words, as shown in FIG. 3, if it is determined at step S6 that the predetermined number of tracks have not been advanced from the reference track position at step S3, the microcomputer 10 increments an error count by one at step S9 and compares the incremented error count with a predetermined reference value at step S10 to determine whether the incremented error count is greater than or equal to the predetermined reference value. If it is checked at step S10 that the incremented error count is smaller than the predetermined reference value, the microcomputer 10 returns to step S2 to repeat the above-mentioned steps S2 to S10 using a new reference track. However, in the case where it is determined at step S10 that the incremented error count is grater than or equal to the predetermined reference value, the microcomputer 10 proceeds to step S7 to detect program data associated with the reference track position. Then, the microcomputer 10 inserts the skip command in the program data detected from the RAM 5 and stores the corrected program data in the RAM 5. As a result, when the user again selects the reproduction function for the compact disc 1 under the condition that no error resulting from the external vibration has occurred, the CDP automatically skips the scratched or damaged track of the compact disc 1 and reproduces only the audio data recorded on the normal tracks of the compact disc 1.

As is apparent from the above description, according to the present invention, when the predetermined number of tracks are not advanced from a reference track position of the compact disc, the microcomputer determines that the detected track position is abnormal and then performs the control operation to skip the track position. Therefore, the skip function is automatically performed. This has the effect of providing the user with convenience when listening to audio recorded on a compact disc with a damaged surface area.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A method for preventing audio data on a scratched portion of a compact disc from being reproduced by a compact disc player, wherein said compact disc has audio and associated program data recorded thereon and said audio data is recorded in tracks and said compact disc player has a random access memory for storing the program data, a timer, and a microcomputer responsive to the program data, said method comprising the steps of:

(a) setting a reference track position of the compact disc corresponding to audio data being reproduced;

(b) determining whether a predetermined number of tracks has been advanced from the reference track position during reproduction of the audio data; and (c) inserting a skip command in program data associated with the reference track position data, when during said determining step, the predetermined number of tracks has not been advanced from the reference track position.

2. A method for preventing audio data on a scratched portion of a compact disc from being reproduced as set forth in claim 1, further comprising the steps of:

initializing said timer and starting a counting operation after said reference track setting step;

comparing the time counted by said timer with a predetermined reference time during reproduction of the audio data; and performing said track number determining step when during said comparing step the counted time is the same as the predetermined reference time.

3. A method for preventing audio data on a scratched portion of a compact disc from being reproduced as set forth in claim 1, further comprising the steps of:

outputting a control signal to said random access memory to detect the program data associated with the reference track position if during said determining step, the predetermined number of tracks has not been advanced from the reference track position, said outputting step occurring before said skip inserting step; and storing corrected program data in said random access memory after said skip inserting step.

4. A method for preventing audio data on a scratched portion of a compact disc from being reproduced as set forth in claim 1, further comprising the steps of:

incrementing an error count by one if during said determining step, the predetermined number of tracks has not been advanced from the reference track position, comparing the incremented error count with a predetermined reference value to check whether the incremented error count is greater than or equal to the predetermined reference value, performing said skip inserting step if the incremented error count is greater than or equal to the predetermined reference value.

5. A method for preventing audio data on a scratched portion of a compact disc from being reproduced by a compact disc player, wherein said compact disc has audio and associated program data recorded thereon and said audio data is recorded in tracks and said compact disc player has a random access memory for storing the program data, a timer, and a microcomputer responsive to said program data, said method comprising the steps of:

setting a reference track position of the compact disc corresponding to audio data being reproduced;

determining whether a predetermined number of tracks has been advanced from said reference track position during reproduction of the audio data;

incrementing an error count when during said determining step, the predetermined number of tracks has not been advanced from said reference track position;

comparing said incremented error count with a predetermined reference value;

inserting a skip command in program data associated with the reference track position to correct the associated program data when during said error count comparing step, the incremented error count is equal to said predetermined reference value.

6. The method for preventing audio data on a scratched portion of a compact disc from being reproduced as set forth in claim 5, further comprising the steps of:

initializing said timer and starting a counting operation after said reference track setting step;

comparing the time counted by said timer with a reference time during reproduction of audio data;

performing said track number determining step when during said comparing step, the counted time is the same as the predetermined reference time.

* * * * *